(No Model.)
P. G. HUBERT.
Apartment House.
No. 241,493. Patented May 17, 1881.
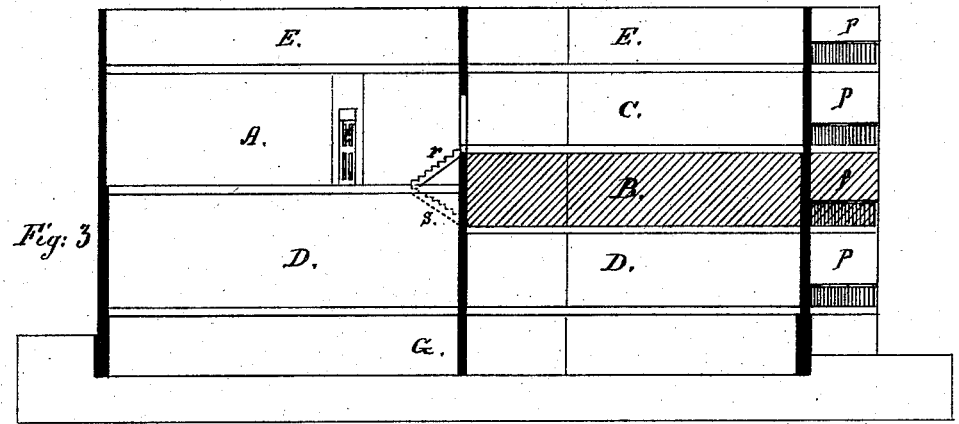
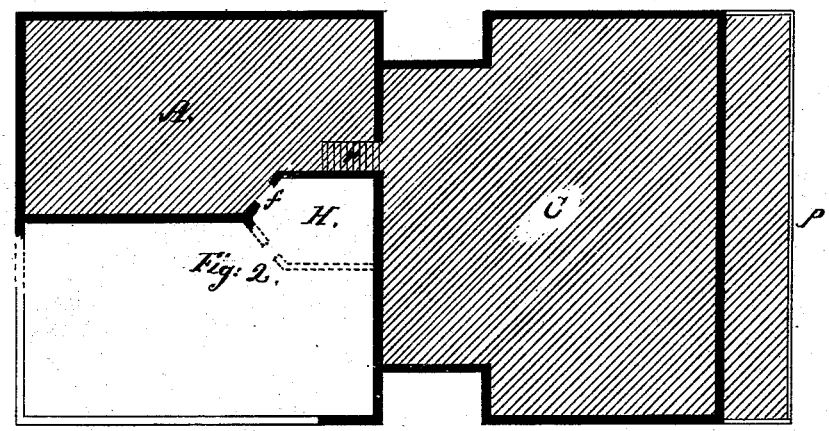
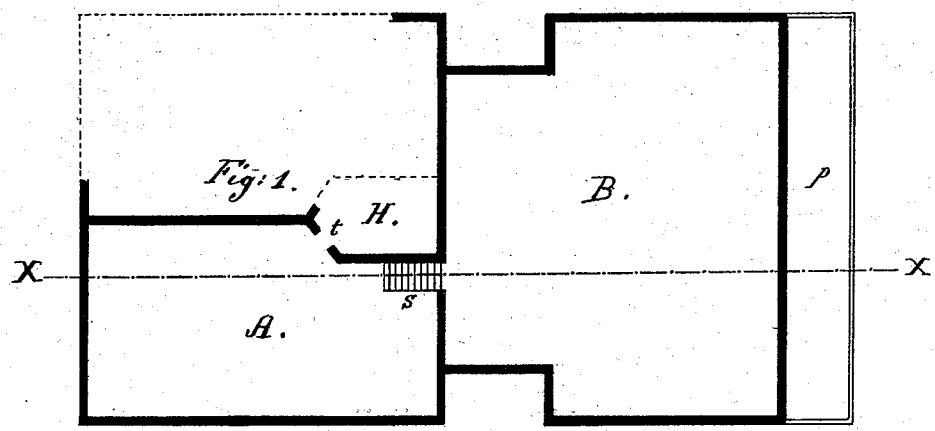
Witnesses:
Henry G. Hubert Jr.
Adeline G. Hubert.
Inventor:
Philip Gengembre Hubert,
per Henry Gengembre Hubert
atty.
N. PETERS, Photo-Lithographer, Washington, D. C.

UNITED STATES PATENT OFFICE.

PHILIP G. HUBERT, OF NEW YORK, N. Y.

APARTMENT-HOUSE.

SPECIFICATION forming part of Letters Patent No. 241,493, dated May 17, 1881.

Application filed February 28, 1881. (No model.)

*To all whom it may concern:*

Be it known that I, PHILIP GENGEMBRE HUBERT, a citizen of the United States, residing in the city of New York, county and State of New York, have invented a new and useful Improvement in Apartment-Houses, by which the area of flooring in apartments built on a lot of a given size is much increased, and far better light and ventilation secured than would otherwise be possible; and I do hereby declare that the following is a full, clear, and exact description of my invention, which will enable others skilled in the art to which it appertains to make and use the same.

Heretofore in constructing apartment-houses the building is divided horizontally into floors, extending each on the same level over the whole surface of the building, and known as the "first," "second," "third" floor, &c., each floor being occupied by one or more apartments. If the height of ceilings of these floors is made suitable for parlors, libraries, &c., it is extravagantly high for bed-chambers, kitchens, pantries, bath-rooms, &c., and much valuable space wasted. If, on the other hand, the height of the ceilings is made suitable to bed-chambers, kitchens, &c., the effect of the parlors is spoiled by the ceilings being too low and the front of the house is devoid of all architectural beauty on account of the stories being too numerous and the windows too low to produce a good and imposing effect.

To remedy these defects my improvements consist in dividing horizontally the front part of the house into floors of a suitable height for parlors, libraries, dining-rooms, &c., precisely as in a private house. The parlor-floor is made of a suitable height for parlors, while the rear part of the building is divided horizontally into floors of a suitable height for bed-chambers, kitchens, &c., precisely as the basement and upper floors of a private house are made with ceilings of less height than the parlor-floor in the same house. In a house thus constructed the rear part of the building will have more floors or stories than the front part, and the front and rear will be connected by suitable stairs, so that an apartment occupying one-half of the front part of the house will, by descending a few steps, have the whole of the rear, while another apartment occupying the other half of the front part of the house will, by ascending a few steps, also have the whole of the rear part, but above the rear part belonging to the apartment first mentioned, and both will be kept perfectly distinct and private. By this arrangement each apartment will have a large increase in area, the height of the different rooms will be suitable, and will correspond with the same rooms in private houses, and the front of the house will present a fine and imposing effect; besides which the rear part of each apartment will be open to the air and light on three sides and perfect and thorough ventilation be secured.

In the accompanying drawings forming part of my specification, Figure 1 represents one half of the second floor front and the whole of the second floor rear in one of my improved apartment houses. Fig. 2 represents the other half of the same second floor front and the whole of the second floor rear, each forming a separate and complete apartment. Fig. 3 is a sectional elevation through the lines X X of my improved apartment-houses.

G is the cellar of the building. D D is the first floor, which has high ceilings in the front part and lower ceilings in the rear part. This floor may be divided or not in the ordinary way. A is the second floor front of the building. B is the second floor rear of the building. C is the third floor rear of the building. E E is the third floor front and fourth floor rear. *s* represents the steps or short stairs connecting the several front and rear floors. *t* is the entrance-door to apartment A C. *f* is the entrance-door to apartment A B. H is the public stairs, hall, and elevator.

The dotted and the solid lines are used to distinguish the two apartments, which occupy each one half of the front part of the house and the whole of the rear part thereof. The same horizontal divisions of the building may be repeated a second, third, and fourth time, &c., making every alternate front floor run level right through to the rear of the building, and every other front floor to connect by steps upon one side of the house and down on the other, with two floors at the rear set intermediary between the floors running horizontally through the whole building.

I am well aware that in private houses the ceilings of the rooms in the rear part of the house are often made lower than the ceilings of the rooms in the front part, and that the second floor rear is made accessible from the landing of the stairs, and that I do not claim as my invention.

I am also aware that in certain tenement-houses the floors of the apartments in the rear part of the house are set half-way been the floors of the apartment in the front part of the house, for the purpose of allowing the apartment at the rear to be reached from the stair landing; but in such houses the front and rear apartments are separate apartments with ceilings of equal height, and this I do not claim as my invention.

What I do claim as my invention is—

1. In apartment-houses, an apartment occupying one half of a floor on the front part of the house and the whole of a rear floor in a different level, in combination with a second apartment occupying the other half of said floor on the front part of the house and the whole of a rear floor immediately above or below the one occupied by the first apartment.

2. In apartment-houses, the combination of the alternate floors running horizontally through the whole building from front to rear with one intermediate floor in the front part of said building connected by steps or stairs with two intermediate floors in the rear part of said building, substantially as and for the purposes herein set forth.

P. GENGEMBRE HUBERT. [L. S.]

Witnesses:
  C. J. SALYAM,
  E. D. JENNING.